United States Patent
Sorg et al.

[11] Patent Number: 6,154,481
[45] Date of Patent: Nov. 28, 2000

[54] METHOD OF OPERATION OF A GLASS MELTING FURNACE AND A GLASS MELTING FURNACE FOR THE PRACTICE OF THE METHOD

[75] Inventors: Helmut Sorg, Glattbach; Helmut Pieper, Lohr am Main, both of Germany

[73] Assignee: Beteiligungen Sorg GmbH Co. KG, Lohr am Main, Germany

[21] Appl. No.: 09/286,741

[22] Filed: Apr. 6, 1999

[30] Foreign Application Priority Data

Apr. 6, 1998 [DE] Germany .......................... 198 15 326

[51] Int. Cl.[7] .................................................. C03B 5/027
[52] U.S. Cl. ................................ 373/30; 373/31; 373/32; 373/34; 65/346
[58] Field of Search .................................. 373/27, 29, 30, 373/31, 32; 65/34.5, 135.7, 135.8, 178, 335, 346, 135.1, 135.5

[56] References Cited

U.S. PATENT DOCUMENTS

| | | | |
|---|---|---|---|
| 1,944,855 | 1/1934 | Wadman | 373/32 |
| 3,523,780 | 8/1970 | Plumat | 373/32 |
| 4,882,736 | 11/1989 | Pieper | 373/32 |
| 4,932,035 | 6/1990 | Pieper | 373/32 |
| 5,766,296 | 6/1998 | Moreau | 65/34.5 |

FOREIGN PATENT DOCUMENTS

| | | |
|---|---|---|
| 2737487 | 2/1997 | France . |
| 39 03 016 | 11/1991 | Germany . |

*Primary Examiner*—Tu Ba Hoang
*Attorney, Agent, or Firm*—Sonnenschein Nath & Rosenthal

[57] ABSTRACT

In a glass melting furnace, a radiation screen wall is installed between a melting area and a refining area with a refining bank. This radiation screen wall leaves a flow path above the melt surface of the glass bath for the return flow of at least part of the combustion gases from the refining area to the melting area. In order to suppress a return flow of already refined and very hot glass melt from the refining area into a melting area, but still allow the charging material to melt completely as early as possible, the furnace is operated to produce at least one upward current between the middle of the melting area and the front face of the refining bank in the glass melt. Within the glass melt and before the melt surface is reached, this upward current is divided into a first partial current which flows upstream into the melting area and a second partial current which flows downstream over the refining bank, whereby a return current of the glass melt from the refining area into the melting area is prevented by the second partial current flowing downstream. This upward current is achieved by the use of one or more of the following arrangements: a row of bubblers; a step projecting upwards from the furnace bottom; and/or at least two heating electrodes which are installed before the front face of the refining bank.

15 Claims, 7 Drawing Sheets

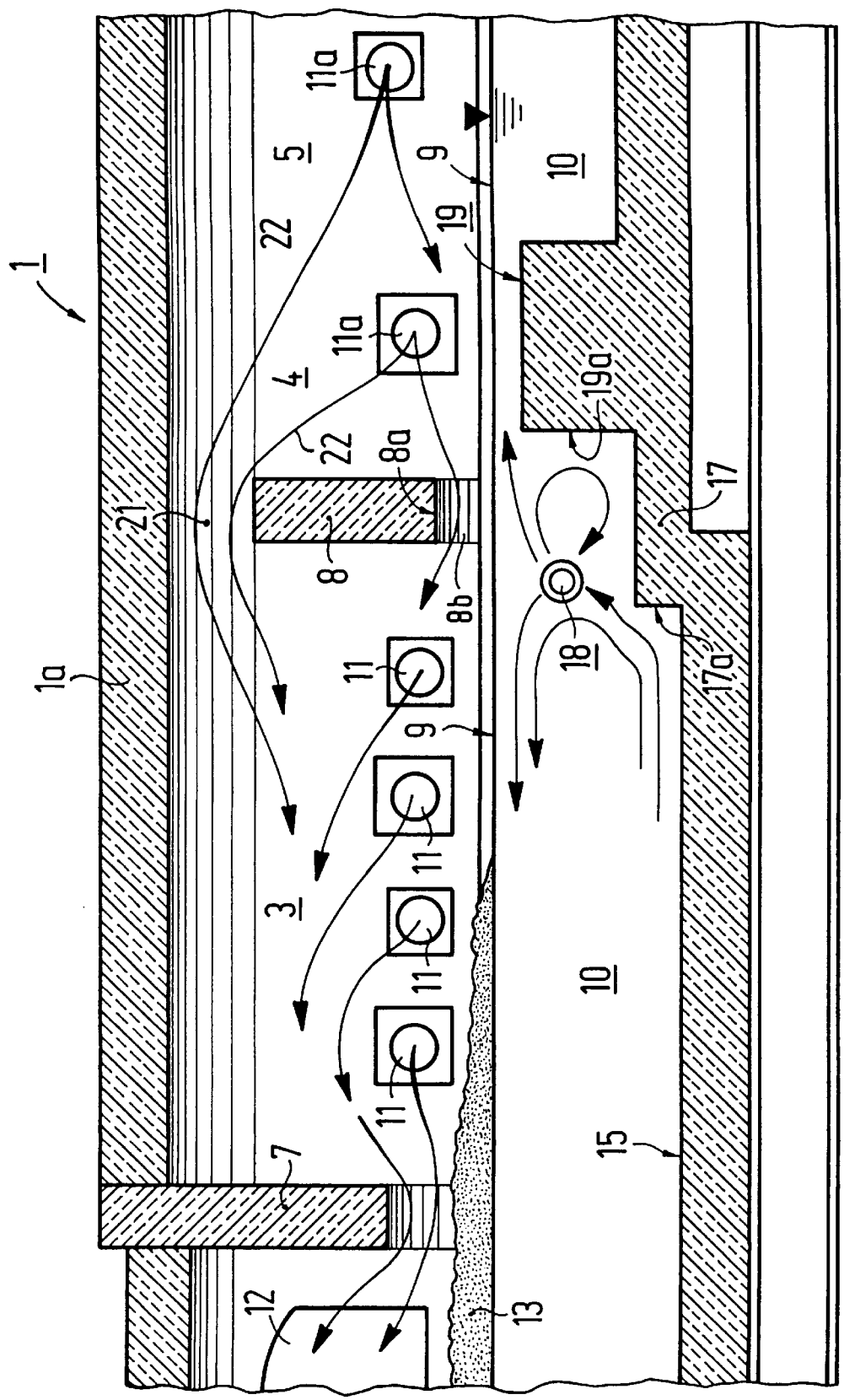

METHOD OF OPERATION OF A GLASS MELTING FURNACE AND A GLASS MELTING FURNACE FOR THE PRACTICE OF THE METHOD

BACKGROUND OF THE INVENTION

The invention concerns a method of operating a furnace in which a radiation screen wall is installed between a melting area and a refining area with a refining bank. This radiation screen wall leaves free at least one flow channel above the surface of the glass melt for a countercurrent flow of at least a part of the combustion gases from the refining area to the melting area.

U.S. Pat. No. 4,932,035 describes such a glass melting furnace. It is mainly used to ensure that the glass remains fluid during discontinuous operation, by means of internal heat exchange between the waste gases from the burners and the glass melt, and to bring the glass to the necessary working temperature quickly and very efficiently after a re-start of operation. A first radiation screen wall, installed in the melting area, the lower edge of which wall being just above the charging material, contributes to the complete melting out of the charging material by means of the counter-flow of the hot combustion gases. A flow channel for the combustion gases in a second radiation screen wall, installed immediately in front of the refining area, does not produce any appreciable heat exchange, as the lower edge of this flow channel is at a noticeable distance from the glass melt.

In the aforesaid solution a difficult-to-cool bottom outlet channel for the glass melt is installed in the middle of the furnace and in front of the refining bank. Such bottom outlet channels are considerably narrower than the furnace bottom and/or the distance between the side walls of the furnace and therefore have a small flow cross section. Therefore there is a high flow velocity in the bottom outlet channels which results in intense corrosion of the hot surrounding walls which are made of mineral materials.

U.S. Pat. No. 4,882,736 describes a glass melting furnace in which bottom electrodes are installed below the charging area at a great distance from the refining area. These bottom electrodes produce an upward current, which introduces additional melting heat from below into the charging material. As indicated on the drawing by the flow arrows, the upward current at this location not only has no influence on the processes in the refining area, but it also slows the return flow of the glass melt and does not have any synergistic interaction w with the counter-flow of the combustion gases, i.e., the gases are drawn off before they reach the upward current of the glass. Therefore, the charging material is neither heated simultaneously nor at the same location by the combustion gases from above or by the bottom electrodes from below. Neither is a radiation screen wall, the bottom edge of which could form a flow channel for a counter-flow of the combustion gases, installed above the bottom electrodes.

Downstream of these bottom electrodes, the furnace bottom rises gradually in the shape of a long ramp to the height of the refining bank, on the upper side of which a step is installed. The step is "straddled", so to speak, across the angle between the sloping furnace bottom and the refining bank. The step, therefore, has a volume regulating function and does not increase the effect of the bottom electrodes, which are installed in the charging area at a significant distance upstream of the step. The surface of the refining bank situated behind the step must therefore be at a greater distance from the melt surface, which works contrary to the effect of the refining bank. With this technology, it is the bottom of the melting area that produces a flow pattern, through which the hot glass on the bath surface flows back to the floating batch layer. However, this produces a surface flow, which continually moves glass, heated intensively by the burners, from the refining area into the charging area. This causes currents that are difficult to control and flow in opposite directions above the raised area, as in fact charging material is being added continually, and molten glass must be extracted from the furnace. This has a further, very significant disadvantage, already refined, i.e., pure molten glass, is re-introduced into the charging and melting area, where it comes into contact with the charging material and must then be refined again.

SUMMARY OF THE INVENTION

Objects of the invention therefore are to provide a method of operation and a glass melting furnace for such a method, in which the advantages of the above-mentioned furnace are retained, in which, however, provisions have been made to reduce the corrosion of tank blocks, in which the efficiency is not reduced by heat exchange but is increased where possible, in which a return flow of already refined and very hot glass from the refining area is prevented from entering the melting area, and in which the charging material is melting as early as possible along its path.

These objects are accomplished according to the method described above, in that between the middle of the melting area and the front face of the refining bank, at least one upward current is produced in the glass melt, this current being divided into two partial currents before the bath surface is reached, the first partial current flowing upstream into the melting area and the second partial current flowing downstream onto the refining bank, whereby molten glass is prevented from flowing back from the refining area into the melting area by means of the second, downstream flowing partial current.

The invention also concerns a glass melting furnace with a melting tank having a furnace bottom and burners for at least partial heating by means of fossil fuel, where the following are installed between a charging end and an extraction end and in the direction of the glass flow: a melting area with at least one waste gas outlet for combustion gases, a refining area with burners and a refining bank with a front face projecting up from the furnace bottom, and an homogenization area, whereby, between the melting area and the refining area, a radiation screen wall is installed in front of the latter, such wall leaving free at least one flow channel for a counter-current flow of the combustion gases from the refining area to the melting area.

The objects of the invention are accomplished by the glass melting furnace described above, in that between the middle of the melting area and the front face of the refining bank, viewed in the direction of transport of the glass melt, an arrangement is provided to create an upward current in the glass melt towards the bath surface and a glass flow upstream towards the charging end and downstream towards the refining bank on the glass surface.

This upward current moves from bottom to top, that is, perpendicular to the cumulative flow of the glass melt, which in the main, runs horizontally from the charging end to the extraction point, when localized individual currents are disregarded. The cumulative flow is therefore proportional to the furnace throughput, taking the furnace geometry into consideration. The upward current or a number of upward currents create a defined (initial) part of the surface return flow towards the charging end and a further defined (second) part of the surface forward flow towards the refining area, and also form a very effective barrier against a return flow of already refined and very hot glass melt from the refining area to the melting area. The interaction with the radiation screen wall plays a decisive role in this, as the radiation from the burner flames in the refining area is concentrated here and provides the high refining temperature required, the level of which (as of all other temperatures) depends on the glass type.

However, the effect of the defined first part of the surface return flow to the charging end is maintained. This effect is such that the charging material is heated from below and therefore melts more quickly, and is simultaneously prevented from moving too far forward.

The arrangement for producing this effect can comprise the following, depending on various versions of the subject of the invention, either singly or as combinations:

a) in a combination of features comprising bubblers in the furnace bottom and a subsequent step, b) in a combination of features comprising bubblers and heating electrodes in the furnace bottom, without a subsequent step, c) in a combination of features comprising bubblers in the furnace bottom and heating electrodes above a subsequent step, d) in a step which extends from the front face of the refining bank, at a lower height that this, towards the charging end, e) in a combination of features comprising a step and heating electrodes installed above the step, f) in a combination of features comprising a step and bubblers installed in the step, g) in that when using a step projecting up from the furnace bottom; this step
   g1) extends across the complete width of the furnace bottom.
   g2) is between 0.25 times and 0.75 times the height of the refining bank above the furnace bottom,
   g3) extends both against the horizontal flow direction of the glass melt and also under the radiation screen wall.

The effect can also be augmented in that:

h) the lower edge of the radiation screen wall is submerged in the glass melt where it creates a slit-shaped opening for the glass melt above the step which projects up from the furnace bottom, i) the radiation screen wall is supported on the step by at least one support, which is installed between two flow apertures, such that the total width of all flow apertures corresponds largely to the width of the furnace bottom and the flow apertures are distributed evenly across this width, j) a vertical gap or passage is provided between the back of the radiation screen wall and the front face of the refining bank through which the glass melt passes, and in which gap at least two heating electrodes are installed.

k) the step extends at least partly against the horizontal flow direction of the glass melt up to and under the second radiation screen wall.

Hereby it is particularly advantageous if a further radiation screen wall is installed within the melting area between the waste gas outlet and the radiation screen wall installed in front of the refining area. This further wall divides the melting area into a first section with the waste gas outlet and a second section, and has a lower edge which leaves free an additional serial flow channel for the return flow of the combustion gases from the second section to the first section and to the waste gas outlet. This again considerably increases the thermal efficiency.

The term "row(s)" of heating electrodes and bubblers does not mean that these must be equidistant from one another either laterally or longitudinally. On the contrary, it may be possible, and even advantages, to vary the local density of burners and bubblers by setting them at different distances apart, so that the local heat balances and flow patterns can be optimally adjusted.

The term "below the radiation screen wall" does not mean that it only refers to a location within the vertical projection of the radiation screen wall onto the furnace bottom or the step. On the contrary, this definition includes the possibility that the arrangement which produces an upward current of the glass in the glass melt referred to above can also extend upstream and downstream of the second radiation screen wall mentioned above, depending on the optimum distance apart for the various components of the arrangement.

The solution according to the invention has the following advantages:

1. avoidance of narrow bottom outlet channels with the usual small cross sections, which are liable to heavy corrosion, and of equipment for intensive cooling,
2. significant barrier effect against:
   a) penetration of charging material into the refining area and
   b) back flow of melt from the refining area into the melting area,
3. good heat exchange between the gas and glass flows (counter-flow) at the locations where the gas and glass flows are narrowest when they converge, and
4. intensive preheating of the melt before the transfer to the refining bank.

U.S. Pat. No. 5,766,296 refers to a barrier wall or trapezoidal barrier which rises above the furnace bottom, the installation of a row each of bubblers and heating electrodes, and a further row of heating electrodes behind the barrier, in order to produce "circulating currents" which act as a barrier. However, as the furnace crown is smooth and does not have any radiation screen walls, the interaction of the electrodes and the bubblers with a screen wall according to the invention is therefore lacking. In addition, the barrier is not a refining bank, as its upper surface in the direction of flow is much too short and this upper surface is much too far from the glass bath surface, as the height of the barrier may be only a maximum of half of the glass bath depth. The very deep refining zone definitely does not begin until after the barrier. The aforementioned advantages therefore cannot be achieved, at least not in total.

BRIEF DESCRIPTION OF THE DRAWINGS

Embodiments of the invention are described in more detail below, as illustrated in FIGS. 1–7. The figures show:

FIG. 7 is a partial longitudinal section through a fifth variation of the invention as shown in FIG. 2 without bubblers, but with a step and refining bank and with horizontal heating electrodes above the step.

DETAILED DESCRIPTION OF THE PREFERRED EMBODIMENTS

Figure 1:
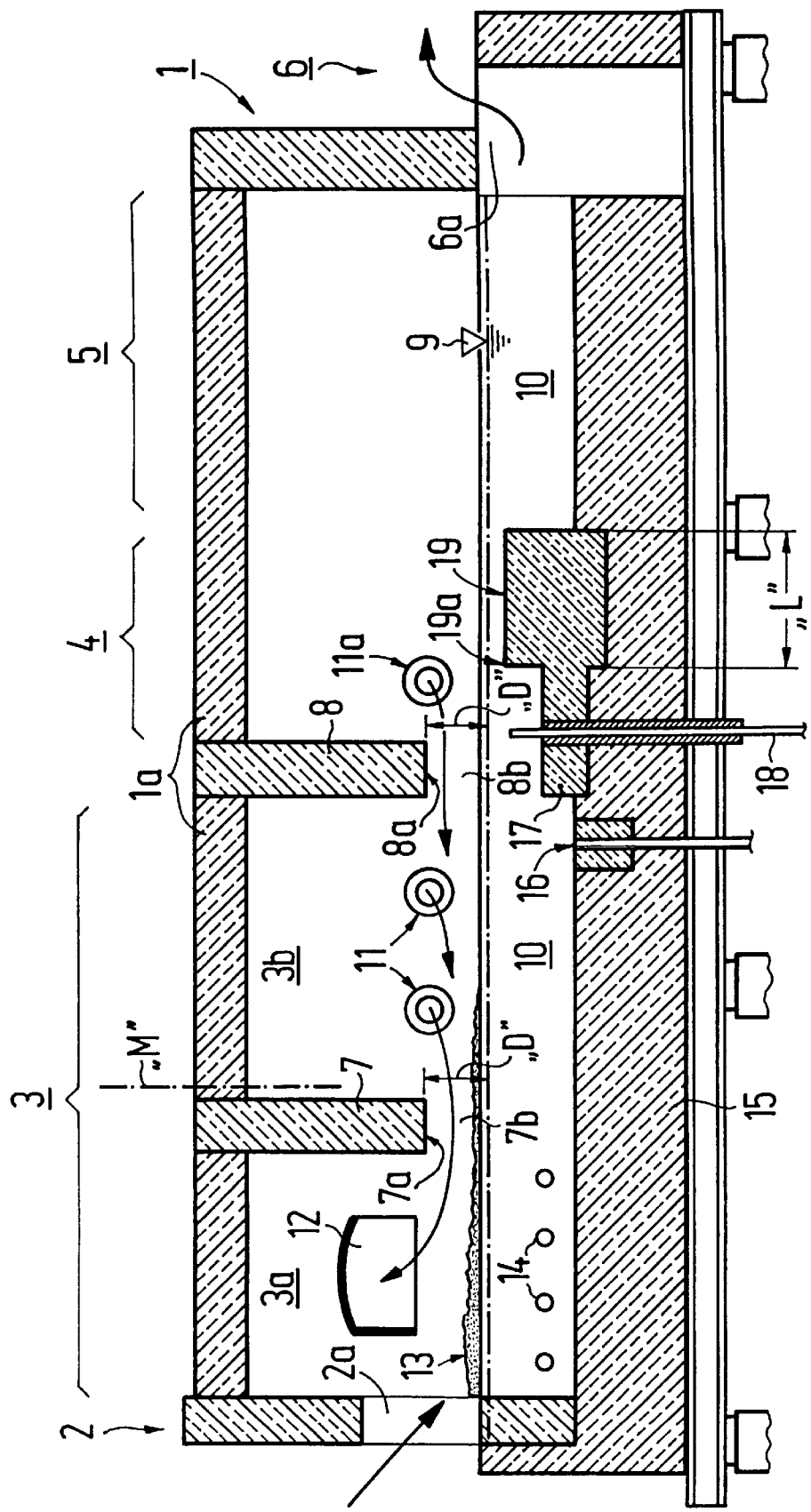
FIG. 1 is a longitudinal section through a glass melting furnace with bubbler, heating electrodes, step and refining bank.

FIG. 1 shows a longitudinal section through a glass melting furnace 1, which, starting from a charging end 2 with a charging opening 2a, has a melting area 3 with sections 3a and 3b, a refining area 4 and a homogenization area 5, and ends in an extraction end 6 with an overflow 6a to the usual working stations, which are not shown. The middle of the melting area is indicated by a dot-dash line "M". The arrangement to produce the upward current in the glass melt described above is applied beyond the middle "M" area.

A first radiation screen wall 7 is provided in the melting area 3 between sections 3a and 3b, and a second radiation screen wall 8 is installed between the melting area 3 and the refining area 4. Both radiation screen walls 7 and 8 have lower edges 7a and 8a, which leave distances "D", which need not be of the same size, above the surface 9 of the glass melt 10. Flow channels 7b and 8b for the return flow of combustion gases are formed by these distances "D". The connection to the furnace crown 1a is unbroken.

Cross-flame burners 11 are installed in pairs opposite one another in section 3b and burners 11a are installed in the refining area 4, whereby the number of such burners and their locations are not limited to the illustration of FIG. 1. The hot waste gases from burners 11 and 11a flow through the flow channel 7b and also partly through the flow channel 8b in the direction of the arrows to a waste gas outlet 12 in the melting area 3.

In the melting area 3 the melt surface 9 is covered with charging material 13, the amount per unit area of which decreases in the direction of the radiation screen wall 8 as a result of the melting process. This melting process takes place from above by means of the hot waste gases from the burners 11 and 11a and can be, but must not necessarily be supported by electrodes 14 in the bottom area of section 3a. Operation of the electrodes 14 can also be time limited, e.g., for heating up purposes.

A row of bubblers 16, a step 17 with a row of heating electrodes 18 and a refining bank 19 are installed in or above the furnace bottom 15 in the area of the radiation screen wall 8. The length "L" of the refining bank 19 is determined by the flow velocity of the glass melt and the required residence time of the melt on the refining bank, and is also dependent on the temperature and/or the glass composition (e.g., high or low melting point glasses, volatilization behavior of low boiling point components, etc.).

The bubblers 16, the step 17 and/or the heating electrodes 18 comprise the arrangement which produces an upward current of the glass in the direction of the counter-flow of the combustion gases below the second radiation screen wall 8 and in the direction of the refining bank 19.

Figure 2:
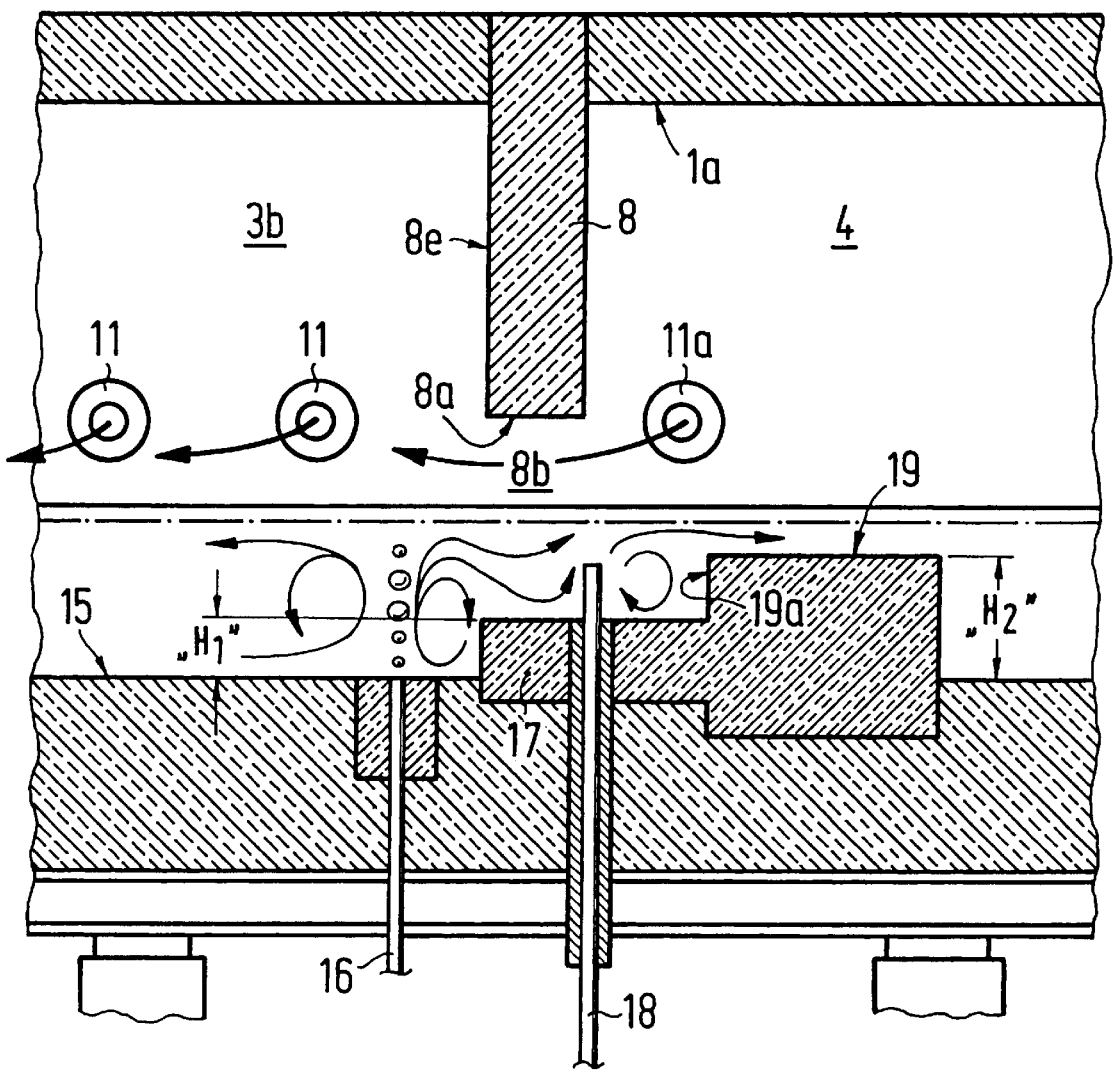
FIG. 2 is an enlarged section of FIG. 1.

The same reference numbers used so far are also applied to FIG. 2. The step 17 projecting up from the furnace bottom 15 extends across the complete width of the furnace bottom 15 and has a height "H1", which is between 0.25 times and 0.75 times the height "H2" of the refining bank 19 relative to the furnace bottom 15. This step extends with its right-angled upstream edge as far as the front side 8e of the second radiation screen wall 8. The resulting flow vectors are indicated by arrows.

As already mentioned, the term "below the radiation screen wall" does not necessarily refer to an installation within the vertical projection of the radiation screen wall 8 on the furnace bottom 15 or on the step 17. On the contrary, this definition includes the possibility that the "arrangement" which produces an upward current of the glass in the glass melt can also extend upstream and downstream of the second radiation screen wall 8, as required by the optimum distances between the components of the "arrangement".

Figure 3:
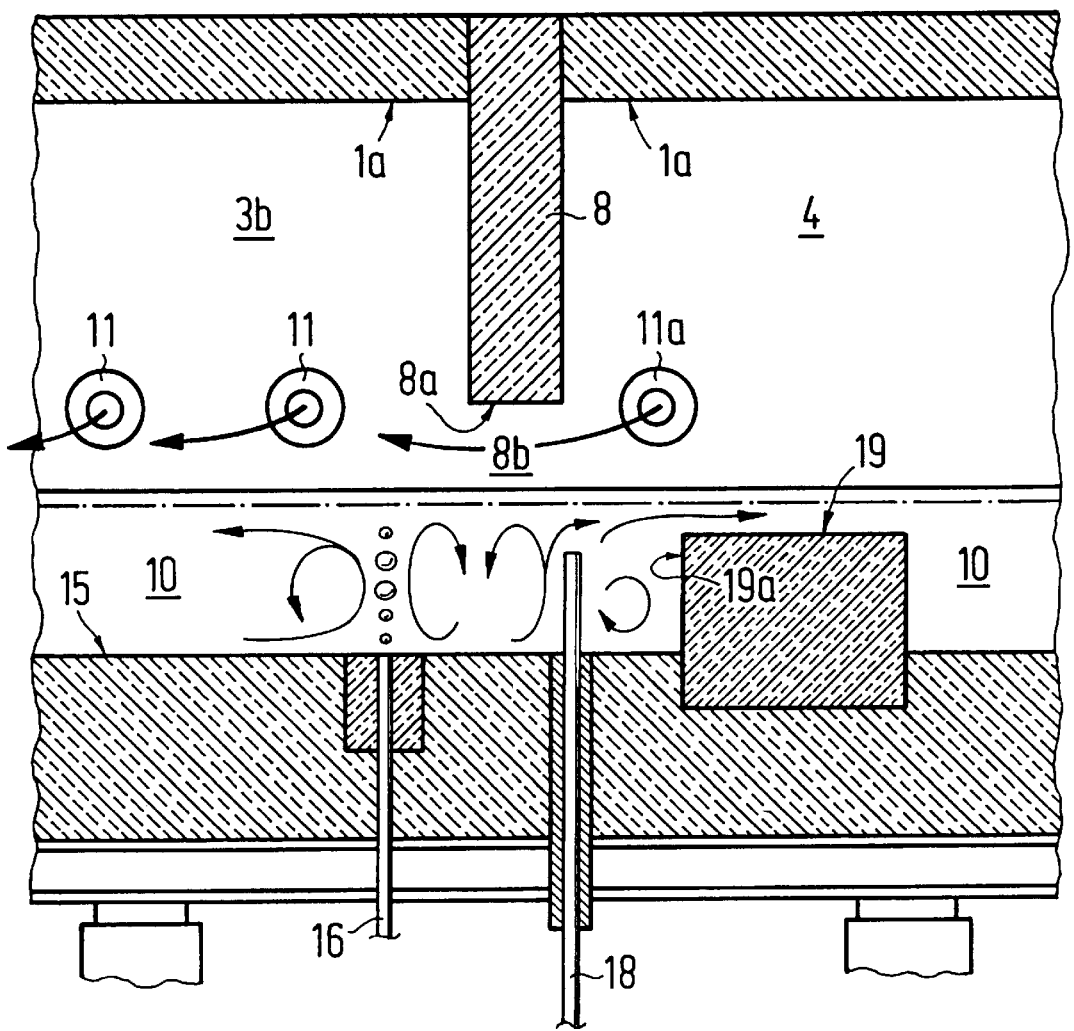
FIG. 3 is a first variation of the invention as shown in FIG. 2 with bubblers, heating electrodes and refining bank, but without a step.

The step is omitted in the version shown in FIG. 3, i.e, in this case the arrangement creating the upward current of the glass consists of a row of bubblers 16 and heating electrodes 18, which are installed in the furnace bottom 15 in front of the vertical front face 19a of the refining bank 19. The resulting flow vectors are indicated by arrows.

Figure 4:
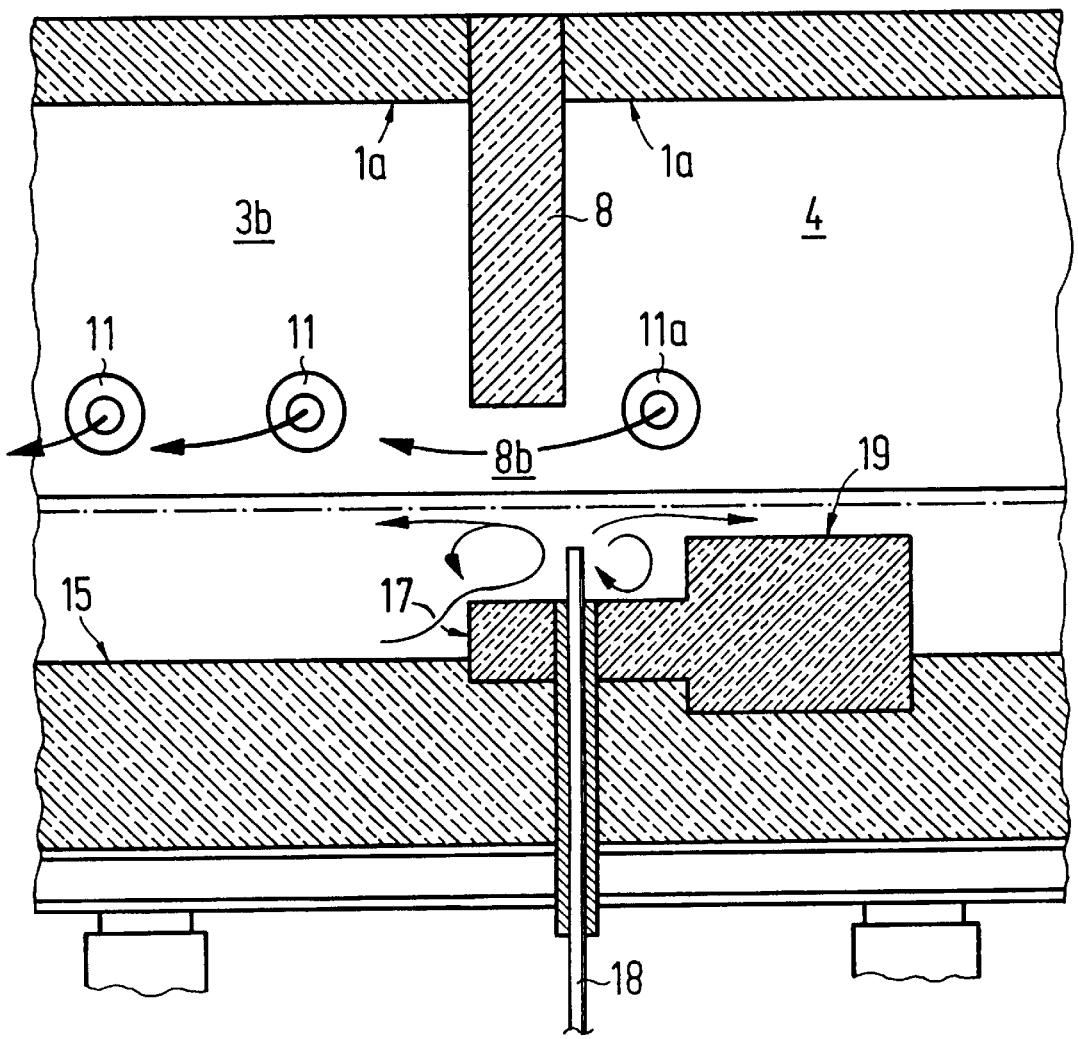
FIG. 4 is a second variation of the invention as shown in FIG. 2 with heating electrodes, step and refining bank, but without bubblers.

The row of bubblers is omitted in the version shown in FIG. 4, i.e., in this case the arrangement creating the upward current of the glass comprises the step 17 with a row of heating electrodes 18 which are installed on the step 17 and in front of the vertical front face 19a of the refining bank 19, which is effectively reduced in height by the step 17. The resulting flow vectors are indicated by arrows.

Figure 5:
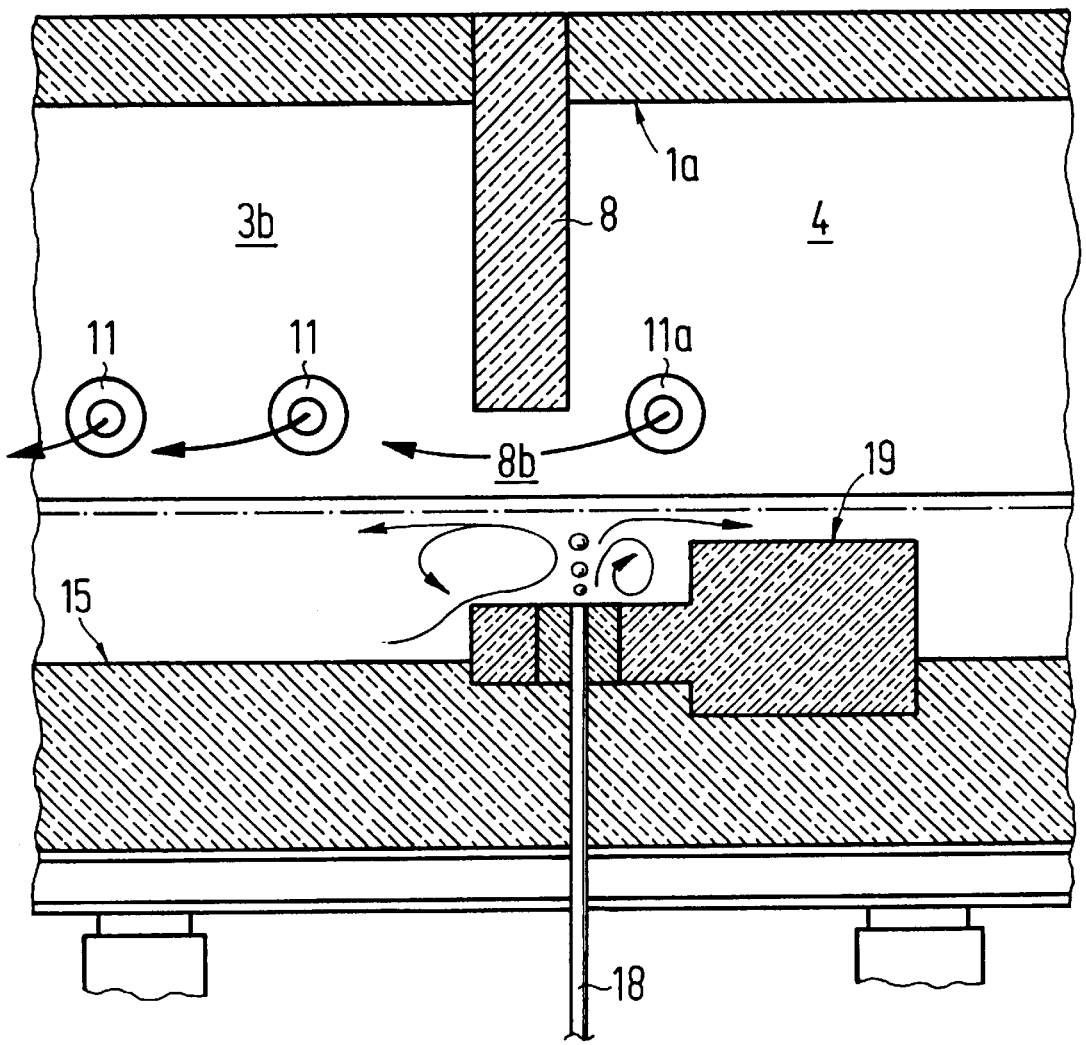
FIG. 5 is a third variation of the invention as shown in FIG. 2 with bubblers, step and refining bank, but without heating electrodes.

The row of heating electrodes was omitted in the version shown in FIG. 5, i.e., the arrangement creating the upward current of the glass in this case comprises the step 17 with a row of bubblers 16, which are installed in the step 17 and in front of the vertical front face 19a of the refining bank 19, which effectively reduced in height by the step 17. The resulting flow vectors are indicated by arrows.

As already described, the subject of the invention leads to a surface return flow of hot glass melt from the area of the bubblers and/or the heating electrodes towards the charging end 2, immediately below the charging material which is moving in the opposite direction. In this way the charging material is heated extremely efficiently from two sides, from above by means of the return flow of the hot burner gases and from below by means of the return flow of the hot glass melt. This ensures that no unmelted charging material, whether it be batch or cutlet, or a mixture thereof, reaches the refining area.

Figure 6:
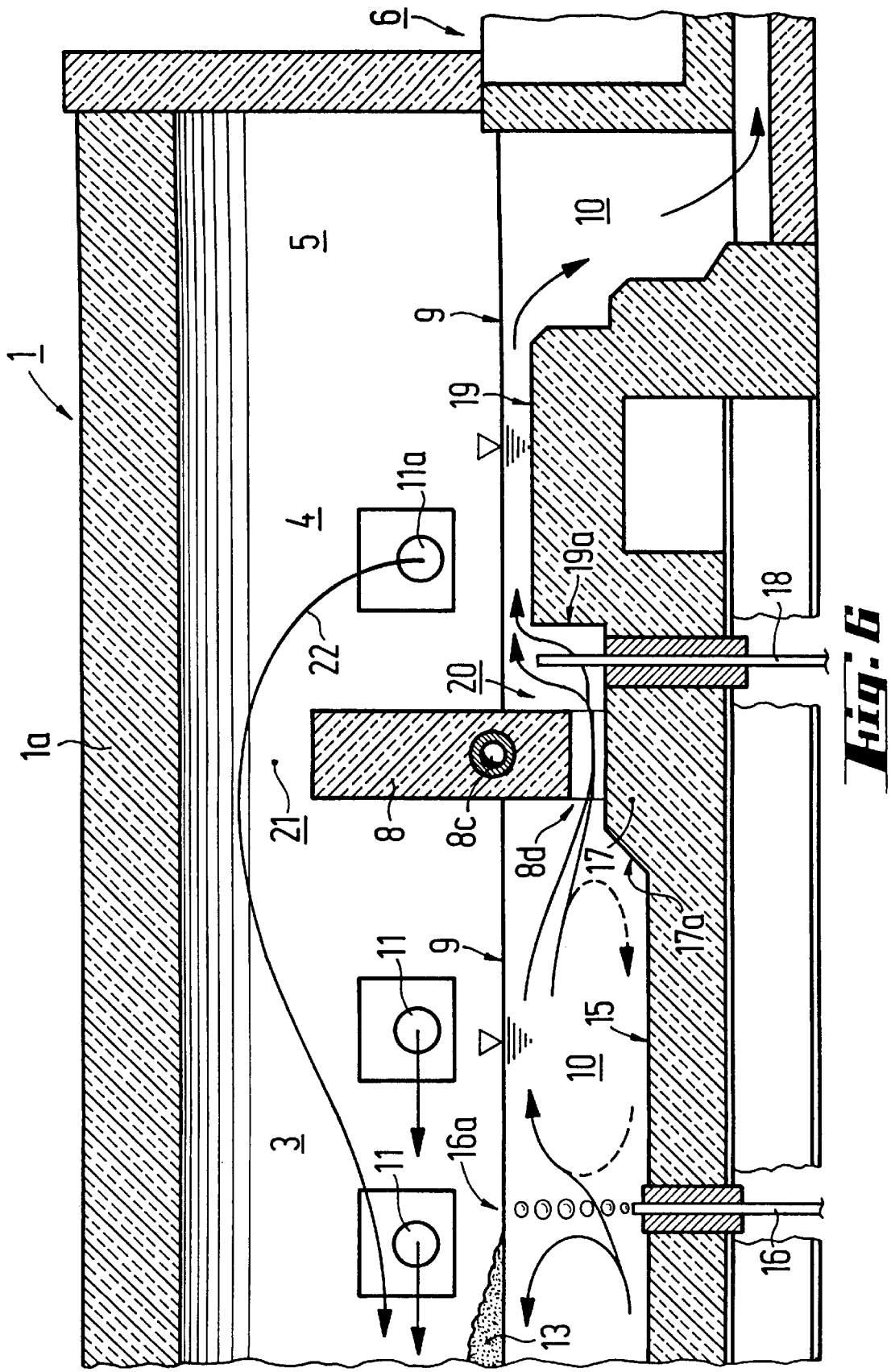
FIG. 6 is a partial longitudinal section through a fourth variation of the invention as shown in FIG. 2 with bubblers, step and refining bank and with heating electrodes on the step.

FIG. 6 shows a further variation, in which the radiation screen wall 8, which is fitted with a cooling element 8c, is submerged in the glass melt 10 while leaving free several horizontal slit-shaped flow apertures 8d underneath the lower edge. These flow apertures are spread evenly across the complete furnace width, with supports in between. As with the previous examples, the cumulative flow of the glass moves horizontally from left to right, i.e., "downstream", and the cumulative flow of the combustion gases moves from right to left, i.e., "upstream", in relation to the glass flow.

In this case, a step 17 also projects upwards from the furnace bottom 15 and is installed in front of the refining bank 19 in the refining area 4 and below the radiation screen wall 8. A row of bubblers 16 is installed across the furnace and in front of the step 17 in the melting area 3 An upward flow in the form of a circulating current is superimposed in and on both sides of a curtain of bubbles, as indicated by the arrows drawn at this location. This causes, among other things, an upstream flow component, i.e., towards the charging end not shown here. which heats the charging material 13 from below, but simultaneously prevents the latter from moving past the bubbler. Possible return flows in the region of the furnace bottom are indicated by dotted arrows. In this case, the sloped front face 17a of the step 17 also creates an upward current of the glass melt 10.

A vertical gap or passage 20 is formed between the submerged part of the radiation screen wall 8 and the front face of the refining bank 19 above the step 17. This gap 20 also extends across the complete furnace width and in the gap a row of heating electrodes 18 are installed perpendicular to the furnace axis. These electrodes 18 intensify the upward current of the glass melt 10, which is indicated at this location by flow arrows. This prevents a return flow of the already refined glass melt IO from the refining area 4 to the melt area 3, so already refined glass melt, which is at its highest temperature above the refining bank 19, does not mix with unrefined, relatively colder glass melt.

The combustion gases from the burners 11 a installed in the refining area 4, only one of which is shown, flow via an upper flow channel 21 in the direction of arrow 22 and combine in the melting area 3 with the combustion gases of the burners 11 installed in this area. The total volume of the combustion gases thereby provides additional heat from above for the charging material 13, whereby it must be stated that the radiation of the burner flames provides the majority of heat from above for the melt and/or the charging material. In this case, the combined effect of the bubblers 16, the step 17, the electrodes 18, the radiation screen wall 8 and the front face of the refining bank 19 produces a clear separation of the processes in the melting area and refining area, and in addition, the energy from the radiation is concentrated by the radiation screen wall 8 in the refining area 4 and the homogenization area 5.

FIG. 7 shows yet another variation, in which the radiation screen wall 8 is not submerged in the glass melt 10, but has an arch-shaped bottom edge 8a which ends above the glass bath surface 9 and under which a flow channel 8b is left free for part of the combustion gases from the refining area 4 and the homogenizing area 5. As with the other examples, the cumulative flow of the glass is from left to right "downstream" and the cumulative flow of the combustion gases is from right to left, i.e., "upstream" in relation to the glass flow.

In this case also, a step 17 projecting up from the furnace bottom 15 is installed in front of the refining bank 19 in the refining area 4, and above this step 17 there are several electrodes 18, of which only one can be seen, and which are installed in pairs either as horizontal side wall electrodes (perpendicular to the plane of the paper) as shown in FIG. 7 or project vertically from the step (and parallel to the plane of the paper as shown in FIG. 6). An upward flow in the form of a circulating current is superimposed in and on both sides of the electrodes, as indicated by the arrows drawn at this location. This causes, among other things, an upstream flow component, i.e., towards the charging end not shown here, which heats the charging material 13 from below, but simultaneously prevents the latter from moving through the electrode area. In this case, the vertical front face 17a of the step 17 also creates an upward current of the glass melt 10.

This also prevents a return flow of the already refined glass melt 10 from the refining area 4 to the melting area 3, so already refined glass melt which is at its highest temperature above the refining bank 19 does not mix with unrefined, relatively colder glass melt.

In addition, the combustion gases of the burners 11a installed in the refining area 4, only two of which are shown, flow through an upper flow channel 21 approximately in the direction of the arrows 22 and combine in the melting area 3 with the combustion gases of the burners 11 installed there. The total volume of the combustion gases thereby provides additional heat from above for the charging material 13, whereby it must be stated that the radiation of the burner flames provides much more heat than convective heat transfer for heating the melt and/or the charging material from above. In this case the combined effect of the step 17, the electrodes 18, the radiation screen wall 8 and the front face 19a of the refining bank 19 produces a clear separation of the processes in the melting area and refining area. In addition, the energy from the radiation is concentrated by the radiation screen wall 8 in the refining area 4 and in the homogenization area 5.

It is not absolutely necessary to install the burners 11 and 11a in pairs opposite one another, they can also be installed offset from one another in a longitudinal direction in the furnace.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit of scope of the present invention.

We claim as our invention:

1. A method of operation of a glass melting furnace utilizing fuel burners generating combustion gases for providing at least a portion of the heat necessary to melt glass into a glass melt flowing from an upstream area at a charging end of a melting area to a downstream area at an extraction end of a refining area within the furnace, in which a radiation screen wall is installed between the melting area and the refining area with a refining bank and at least one pair of fuel burners in said refining area, said radiation screen wall being positioned above a melt surface of the glass melt ad leaving at least one flow channel free for a flow of at least a part of the combustion gases from the fuel burners of said refining area to the melting area, comprising the steps of creating at least one upward current between a middle of the melting area and a front face of the refining bank in the glass melt in a manner such that, in the glass bath and before reaching the glass surface, the current divides into a first partial current moving upstream in the melting area and into a second partial current moving downstream over the refining bank, whereby the second, downstream partial current prevents a return flow of glass melt from the refining bank into the melting area.

2. A glass melting furnace comprising a melting tank with a furnace bottom and utilizing fuel burners generating combustion gases for providing for at least a portion of the heat necessary to melt glass into a glass melt within the melting tank, in which a melting area with at least one waste gas outlet for combustion gases, a refining area with burners and a refining bank with a front face projecting up from the furnace bottom, and a homogenizing area are arranged in a transport direction of the glass between an upstream charging end and a downstream extraction end, whereby a radiation screen wall is provided between the melting area and the refining area and in front of the refining area, said wall leaving free at least one flow channel above a melt surface of the glass melt for a counter-flow of the combustion gases from the refining area to the melting area, said furnace comprising an upward current creating arrangement positioned between a middle of the melting area and the front face of the refining bank, viewed in the transport direction of the glass melt, to create an upward current of the glass melt towards the melt surface perpendicular to the transport direction of the glass melt and to create an upstream glass flow in the direction of the charging end and a downstream glass flow towards the refining bank on the surface of the glass melt.

3. A glass melting furnace according to claim 2, wherein the arrangement creating the upward current of the glass melt perpendicular to the transport direction of the glass melt comprises bubblers in the furnace bottom and a subsequent step.

4. A glass melting furnace according to claim 2, wherein the arrangement creating the upward current of the glass melt perpendicular to the transport direction of the glass melt comprises bubblers and heating electrodes in the furnace bottom.

5. A glass melting furnace according to claim 2, wherein the arrangement creating the upward current of the glass melt perpendicular to the transport direction of the glass melt comprises bubblers in the furnace bottom, a subsequent step and heating electrodes above the subsequent step.

6. A glass melting furnace according to claim 2, wherein the arrangement creating the upward current of the glass melt perpendicular to the transport direction of the glass melt comprises a step which extends from the front face of the refining bank towards the charging end and has a lower height than the refining bank.

7. A glass melting furnace according to claim 2, wherein the arrangement creating the upward current of the glass melt perpendicular to the transport direction of the glass melt comprises a step above which heating electrodes are installed.

8. A glass melting furnace according to claim 2, wherein the arrangement creating the upward current of the glass melt perpendicular to the transport direction of the glass melt comprises a step in which bubblers are installed.

9. A glass melting furnace according to claim 2, wherein the arrangement creating the upward current of the glass melt perpendicular to the transport direction of the glass melt comprises a step which projects up from the furnace bottom and lies in front of the front face of the refining bank, this step a) extending across a complete width of the furnace bottom;

b) having a height which is between 0.25 times and 0.75 times a height of the refining bank relative to the furnace bottom; and c) extending both against a horizontal flow direction of the glass melt and up to and under the radiation screen wall.

10. A glass melting furnace according to claim 2, wherein a further radiation screen wall is provided within the melting area between the waste gas outlet and the radiation screen wall in front of the refining area, which further wall divides the melting area into a first section with the waste gas outlet and a second section and has a lower edge, which leaves free a flow channel above the charging material and the glass melt for the return flow of the combustion gases from the second section into the first section and to the waste gas outlet.

11. A glass melting furnace according to claim 2, wherein at least one flow channel in an upper area of the radiation screen wall is left free, through which flow channel at least a part of the combustion gases from the burners flows from the refining area to the melting area.

12. A glass melting furnace according to claim 11, wherein the radiation screen wall has a lower edge positioned to leave free a flow channel immediately above the melt surface, through which flow channel at least a part of the combustion gas from the burners flows from the refining area to the melting area.

13. A glass melting furnace according to claim 11, wherein the radiation screen wall and a lower edge thereof are submerged in the glass melt and thereby leave free at least a slit-shaped flow aperture for the glass melt above the step which projects upwards from the furnace bottom.

14. A glass melting furnace according to claim 13, wherein the radiation screen wall is supported by at least one support on the step, each such support being positioned between two flow apertures in such a way that a total width of all flow apertures corresponds as near as possible to a width of the furnace bottom and the flow apertures are distributed evenly across this width.

15. A glass melting furnace according to claim 13, wherein a vertical passage is provided for the entry of the glass melt between a back face of the radiation screen wall and the front face of the refining bank, and at least two heating electrodes are installed in this passage.

* * * * *